United States Patent
Kwon

[11] Patent Number: 5,931,910
[45] Date of Patent: Aug. 3, 1999

[54] SYSTEM FOR NODE ADDRESS INITIALIZATION USING POINTERS TO DESIGNATE THE FIRST ADDRESS IN SELECTED SETS OF NODE ADDRESSES CORRESPONDING TO SELECTED INTER-PROCESSOR COMMUNICATIONS

[75] Inventor: Hwan-Woo Kwon, Seoul, Rep. of Korea

[73] Assignee: Daewoo Telecom, Ltd., Incheon, Rep. of Korea

[21] Appl. No.: 08/934,743

[22] Filed: Sep. 22, 1997

[30] Foreign Application Priority Data

Dec. 10, 1996 [KR] Rep. of Korea ............... 96-63870

[51] Int. Cl.⁶ ............................................. G06F 11/00
[52] U.S. Cl. ................ 709/222; 709/220; 709/221; 709/228; 712/15; 713/100
[58] Field of Search ................ 395/800.15, 200.5, 395/200.51, 200.52, 200.58, 653; 712/15; 709/220, 221, 222, 228; 713/100

[56] References Cited

U.S. PATENT DOCUMENTS

| | | | |
|---|---|---|---|
| 4,630,224 | 12/1986 | Sollman | 702/121 |
| 5,390,335 | 2/1995 | Stephan et al. | 395/200.51 |
| 5,519,878 | 5/1996 | Dolin, Jr. | 395/200.5 |
| 5,522,046 | 5/1996 | McMillen et al. | 395/200.69 |
| 5,644,732 | 7/1997 | Davidson | 395/284 |

*Primary Examiner*—Meng-Ai T. An
*Assistant Examiner*—Nabil El-Hady
*Attorney, Agent, or Firm*—Pennie & Edmonds LLP

[57] ABSTRACT

A method of initializing node addresses for use in an electronic switching system comprises the steps of: (a) storing all possible sets of node addresses, each set corresponding to an inter-processor communications configuration, and pointers in a residue of a memory; (b) receiving information on a designated set of node addresses which corresponds to a selected inter-processor communications configuration to be used; (c) locating a pointer corresponding to the designated set of node addresses; and (d) writing each address in the designated set of node addresses onto each corresponding register.

4 Claims, 2 Drawing Sheets

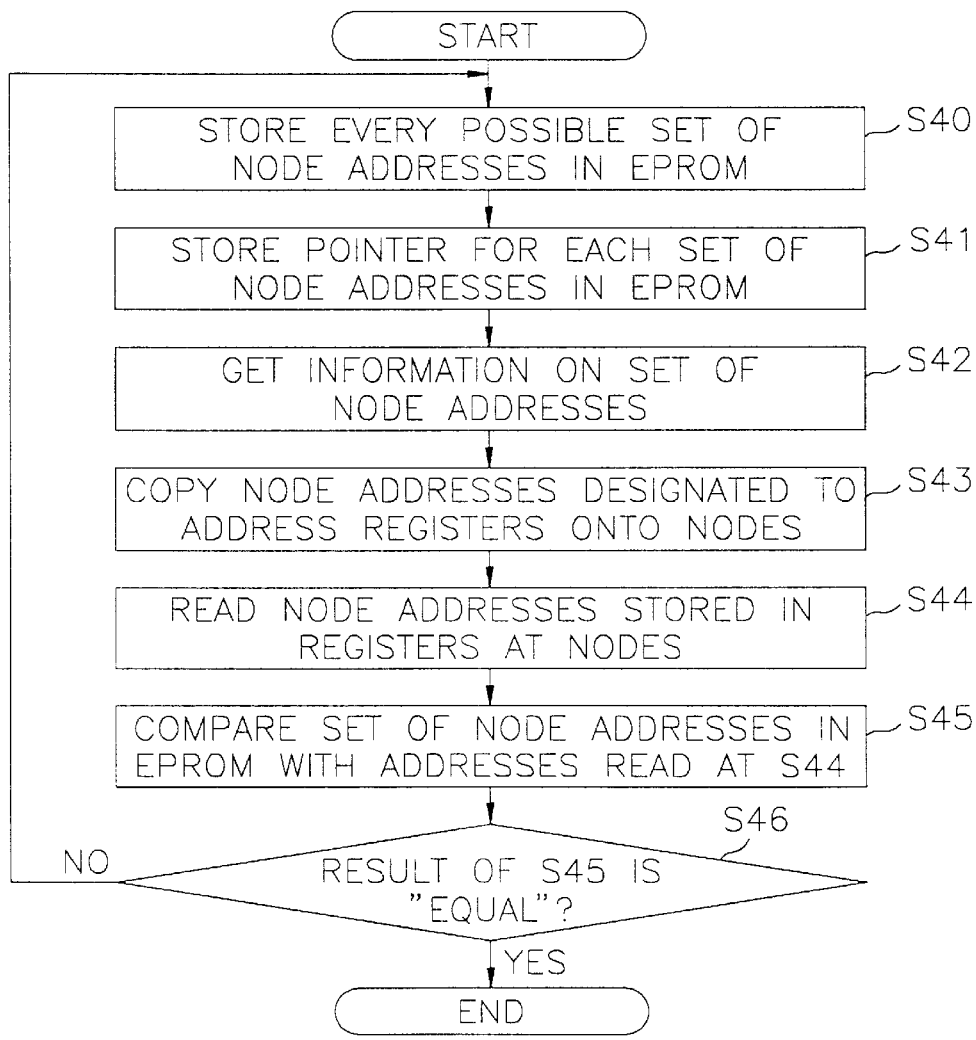

SYSTEM FOR NODE ADDRESS INITIALIZATION USING POINTERS TO DESIGNATE THE FIRST ADDRESS IN SELECTED SETS OF NODE ADDRESSES CORRESPONDING TO SELECTED INTER-PROCESSOR COMMUNICATIONS

FIELD OF THE INVENTION

The present invention relates to an electronic switching system; and, more particularly, to a flexible node address initialization method for use in an inter-processor communications system.

BACKGROUND OF THE INVENTION

A distributed control architecture is a state-of-the-art control architecture for use in an ESS(Electronic Switching System), wherein a number of processors performing a variety of functions are involved and practical and useful cooperations between the processors are achieved by using a so-called IPC(Inter-Processor Communication) network.

For an efficient inter-processor communications system based on the IPC network, there are employed nodes at some intermediate points of the IPC network in order to route and arbitrate a data flow between the processors. To each of the nodes, an independent and unique node address is assigned. Whenever the ESS is turned on, an initialization of the node address is required: that is, the assigned address must be stored at an address register residing therein upon turning the ESS.

In FIG. 1, there is illustrated a conventional node address initialization apparatus which is capable of initializing a single node address. In FIG. 1, the conventional node address initialization apparatus comprises a set of jumper straps 10 and a buffer 11, wherein the number of the jumper straps depends on the word size of the node address and the buffer is connected to the address register residing in each node. One side of each jumper strap is grounded and the other side thereof is connected to the buffer and a voltage source Vcc of, e.g., 5 V, via a pull-up resistor.

If the jumper strap is bridged, 0 V or a logic "0" is inputted to the buffer; otherwise, 5 V or a logic "1" is inputted to the buffer. If the ESS is turned on, a node address word formed by manipulating the jumper straps is stored in the buffer. Then, the node address in the buffer is transferred to the address register 12 at the node. Since the conventional node address initialization apparatus shown in FIG. 1 can initialize only a single node, there are needed as many node address initialization apparatus as the number of nodes involved therein to accomplish the initialization process, thereby making the apparatus complex and costly.

There are further drawbacks in the conventional node address initialization apparatus: for instance, the node address must be manually and individually assigned to every node involved, and, furthermore, it is difficult to realize a high integrity node board due to the non-electronic nature of the jumper straps.

SUMMARY OF THE INVENTION

It is, therefore, a primary object of the present invention to provide a method for realizing an easy and flexible node address initialization and, in addition, a node board with a high degree of integrity.

In accordance with the present invention, there is provided a method of initializing node addresses for use in an inter-processor communications system within an electronic switching system having a processor connected to a memory and to a plurality of nodes, each node having a register storing a node address assigned thereto, wherein the inter-processor communications system employs a designated inter-processor communications configuration out of a plurality of inter-processor communications configurations, and a different set of node addresses is assigned to each inter-processor communications configuration prior to a normal operation of the electronic switching system, respectively, the method comprising the steps of: (a) storing all possible sets of node addresses, each set corresponding to an inter-processor communications configuration, and pointers in a residue of the memory; (b) receiving information from another processor on a designated set of node addresses which corresponds to a selected inter-processor communications configuration to be used; (c) locating a pointer corresponding to the designated set of node addresses; and (d) writing each address in the designated set of node addresses on each corresponding register.

BRIEF DESCRIPTION OF THE DRAWINGS

The above and other objects and features of the present invention will become apparent from the following description of preferred embodiments given with reference to the accompanying drawings, in which:

FIG. 3 shows an exemplary make-up of the node address sets and pointer sets stored in the node address area and the pointer area, respectively, shown in FIG. 2; and FIG. 4 illustrates a flow diagram of the inventive node address initialization method.

DETAILED DESCRIPTION OF THE PREFERRED EMBODIMENTS

Figure 1:
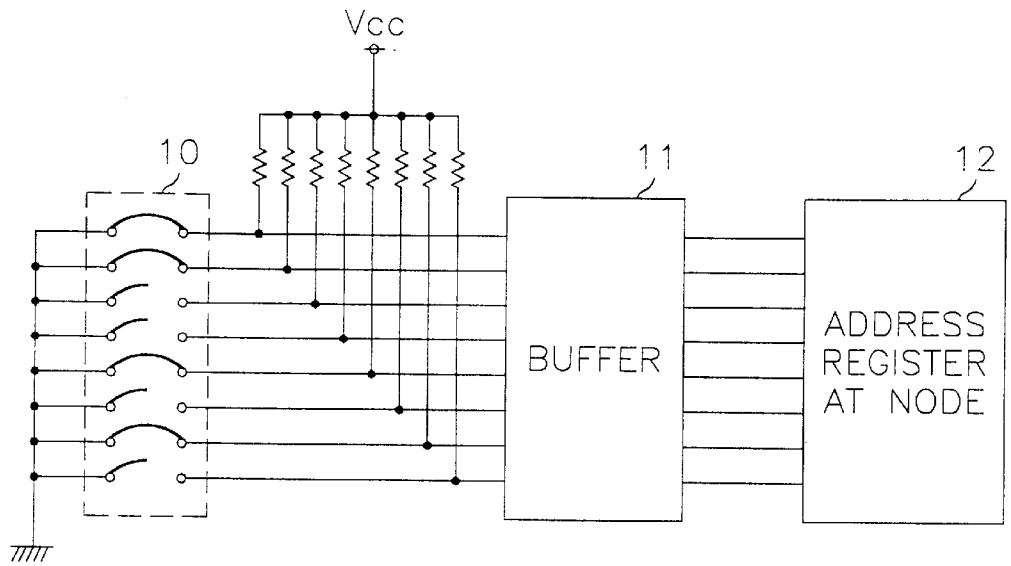
FIG. 1 depicts a conventional node address initialization apparatus.
Figure 2:
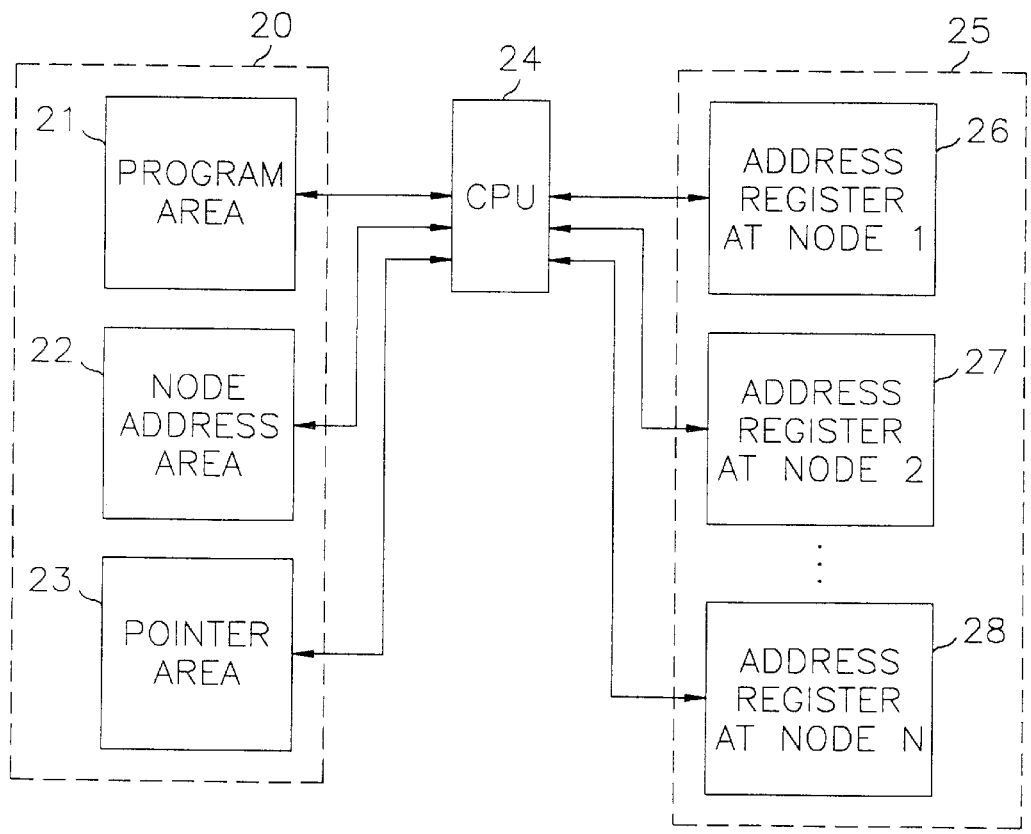
FIG. 2 describes a node address initialization apparatus in accordance with the present invention.

Referring to FIG. 2, there is described a make-up of an apparatus capable of supporting a node address initialization method in accordance with the present invention. The apparatus comprises an EPROM(Erasable Programmable Read-Only Memory) 20, a CPU(Central Processing Unit) 24 and a plurality of node address registers 25. The pair of the EPROM 20 and the CPU 24 can be realized by replacing a ROM in a pair of a ROM and a CPU with the EPROM 20, the pair of a ROM and a CPU being selected among many pairs of them employed in a conventional ESS, wherein the CPU 24 is capable of performing functions related with the node address initialization method in addition to the functions inherently performed at the conventional ESS and the EPROM 20 has additional areas, a node address area and a pointer area to store a node address and a pointer for each node, respectively. The burden to the EPROM 20 and the CPU 24 for performing additional functions related to the node address initialization method is minute as compared with the load for performing the inherent functions thereof, thereby causing no additional problems therewith. However, if there occurs any problem with a pair of the EPROM 20 and a CPU 24, then a new pair of a CPU and an EPROM can be employed.

A memory field of the EPROM 20 is parceled out into three areas: a program area 21, a node address area 22, and a pointer area 23.

The program area 21 is intended to store programs executed by the CPU 24. The node address area 22 refers to a memory field assigned for storing all possible sets of node addresses, each set including node addresses involved in a specific configuration of an IPC(inter-processor communication). The pointer area 23 is for storing pointers, each of the pointers representing a start address of a set of node addresses stored in the EPROM 20 where a specific set of node addresses is stored.

Each of the node address registers 25 refers to a register in every node employed in the IPC. Each of the registers holds an address assigned thereto in the node address registers 26 to 28.

FIG. 3 illustrates an exemplary arrangement of node address sets stored in the node address area, assuming that the number of nodes is four. A first set of node addresses consists of $(00)_{16}$, $(01)_{16}$, $(10)_{16}$, $(11)_{16}$; and a second set of node addresses consists of $(AB)_{16}$, $(BC)_{16}$, $(CD)_{16}$, $(DE)_{16}$. These sets of hexadecimal numbers denote sets of node addresses of all possible IPC configurations. Their exemplary addresses, or the stored places, are $(1000)_{16}$ through $(1111)_{16}$, respectively.

There are stored pointers in the pointer area 23, wherein each pointer represents data holding the address of a first node address in each node address set. For the purpose of illustrating a preferred embodiment, the values of the set pointers are $(1000)_{16}$ and $(1100)_{16}$, respectively.

The node address initialization method in accordance with the present invention will be described hereinafter with reference to FIGS. 2 to 4.

All possible sets of node addresses, e.g., two sets as shown in FIG. 3, have been pre-stored in the node address area 22 before any node address initialization is performed at step S40. One set of node addresses is comprised of addresses $(00)_{16}$, $(01)_{16}$, $(10)_{16}$, $(11)_{16}$; and the other set is made up of addresses $(AB)_{16}$, $(BC)_{16}$, $(CD)_{16}$, $(DE)_{16}$.

At step S41, pointers are stored in the pointer area 23. Each of the pointers represents data holding the address of a first node address in each node address set stored in the node address area 22.

Upon turning on the power of the ESS, at step S42, the CPU 24 receives a notice as to which set of node addresses is selected, from another CPU whichever is in charge of supervising the IPC or an operator. For the purpose of illustration, it is assumed that the first set of node addresses is chosen. In response to the notice, the CPU 24 locates a pointer, i.e., $(1000)_{16}$, in the pointer area 23 indicated in the notice. Then, by using the pointer $(1000)_{16}$, the CPU copies the first node address, $(00)_{16}$, in the designated set of node addresses to a corresponding node at step S43. Subsequently, also at step S43, the CPU 24 copies the following addresses, i.e., $(01)_{16}$, $(10)_{16}$, $(11)_{16}$, one by one, to each corresponding node until all the addresses in the designated set of node addresses are copied.

At step S44, after the copying is completed at step S43, the CPU 24 reads the node addresses back from each node which has been endowed with an address in order to compare the read-back addresses with the node addresses in the designated set of node addresses stored in the node address area 22 to check whether or not they are equal.

If the above comparison results in "equal" at step S46, which suggests that the copying is duly performed, the procedure in accordance with the novel node address initialization method ends. And if otherwise, which suggests the copying is not duly performed, the procedure goes back to step S40. Steps S40 to S46 are iterated until the copying is determined to be duly completed.

From the description above, it is apparent that the inventive method and apparatus have excellence over the conventional ones: for instance, the node address can be automatically assigned nodes involved; and, furthermore, it is easy to realize a high integrity node board since the inventive apparatus is made up of electronic components.

While the present invention has been described with respect to the preferred embodiments, other modifications and variations may be made without departing from the scope and spirit of the present invention as set forth in the following claims.

What is claimed is:

1. A method of initializing node addresses for use in an inter-processor communications system within an electronic switching system having a processor connected to a memory and to a plurality of nodes, each node having a register storing a node address assigned thereto, wherein the inter-processor communications system employs a designated inter-processor communications configuration out of a plurality of inter-processor communications configurations stored in said memory and a different set of node addresses is assigned to each inter-processor communications configuration prior to a normal operation. of the electronic switching system, respectively, the method comprising the steps of:

(a) storing all possible sets of node addresses in node address area of said memory and pointers in pointer area of said memory, each set of said node addresses; corresponding to an inter-processor communications configuration, and each of said pointers corresponding to one of said sets of node addresses;

(b) receiving information from another processor on a designated set of node addresses which corresponds to a selected inter-processor communications configuration to be by said electronic switching system;

(c) locating a pointer in said pointer area of said memory that is corresponding to a first node address of the designated set of node addresses; and (d) writing the first node address and subsequent node addresses in the designated set of node addresses to each of the registers of the corresponding nodes.

2. The method of claim 1, wherein the method further comprising the steps of:

(e) reading each of the node addresses, written at said step (d), from each node;

(f) comparing the node addresses read at said step (e) with the node addresses stored in said memory in the designated set of node addresses to check whether or not they are equal; and (g) ending the procedure if the comparison at the step (f) results in "equal"; and going back to said step (a) if the comparison at the step (f) results in "not equal".

3. An apparatus for initializing node addresses for use in an inter-processor communications system within an electronic switching system having a processor connected to a memory and to a plurality of nodes, each node having a register storing a node address assigned thereto, wherein the inter-processor communications system employs a designated inter-processor communications configuration out of a plurality of inter-processor communications configurations stored in said memory and a different set of node addresses is assigned to each inter-processor communications configuration prior to a normal operation of the electronic switching system, respectively, the apparatus comprising:

(a) means for storing all possible sets of node addresses in node address area of said memory and pointers in pointer area of said memory, each set of said node addresses corresponding to an inter-processor communications configuration, and each said pointer corresponding to one of said sets of node addresses;

(b) means for receiving information from another processor on a designated set of node addresses which corresponds to a selected inter-processor communications configuration to be by said electronic switching system;

(c) means for locating a pointer in said pointer area of said memory that is corresponding to a first node address of the designated set of node addresses; and (d) means for writing the first node address and subsequent node addresses in the designated set of node addresses to each of the registers of the corresponding nodes.

4. The apparatus of claim 3, further comprising:

(e) means for reading each of the node addresses, written by said means of writing, from each node; and (f) means for comparing the node addresses read by said means for reading, with the node addresses stored in said memory in the designated set of node addresses, to check whether or not they are equal.

* * * * *